(12) United States Patent
Labadini et al.

(10) Patent No.: US 9,386,841 B2
(45) Date of Patent: Jul. 12, 2016

(54) PET ACCESSORY BAG COUPLEABLE WITH LEASH IN MULTIPLE DIFFERENT CONFIGURATIONS

(71) Applicants: Christine Pearsall Labadini, Concord, MA (US); Mary Deck Rutledge, Concord, MA (US)

(72) Inventors: Christine Pearsall Labadini, Concord, MA (US); Mary Deck Rutledge, Concord, MA (US)

(*) Notice: Subject to any disclaimer, the term of this patent is extended or adjusted under 35 U.S.C. 154(b) by 0 days.

(21) Appl. No.: 14/790,673

(22) Filed: Jul. 2, 2015

(65) Prior Publication Data

US 2016/0000198 A1 Jan. 7, 2016

Related U.S. Application Data

(60) Provisional application No. 61/998,849, filed on Jul. 2, 2014, provisional application No. 62/130,872, filed on Mar. 10, 2015.

(51) Int. Cl.
| | | |
|---|---|---|
| *A01K 27/00* | (2006.01) | |
| *A45F 5/00* | (2006.01) | |
| *A45F 4/02* | (2006.01) | |
| *A45C 9/00* | (2006.01) | |
| *A45C 11/00* | (2006.01) | |
| *A45F 3/02* | (2006.01) | |

(52) U.S. Cl.
CPC .................. *A45F 5/00* (2013.01); *A01K 27/008* (2013.01); *A45C 9/00* (2013.01); *A45C 11/00* (2013.01); *A45F 4/02* (2013.01); *A45C 2009/007* (2013.01); *A45F 3/02* (2013.01); *A45F 2005/006* (2013.01); *A45F 2200/0516* (2013.01); *A45F 2200/0558* (2013.01)

(58) Field of Classification Search
CPC . A01K 27/006; A01K 27/008; A01K 23/005; A01K 27/003; A01K 27/004; E01H 2001/1286; E01H 1/1206; E01H 2001/128; E01H 2001/1273; E01H 2001/126
USPC ......... 119/797, 792, 793, 794, 795, 796, 798, 119/161, 858; 294/1.3
See application file for complete search history.

(56) References Cited

U.S. PATENT DOCUMENTS

| | | | | |
|---|---|---|---|---|
| 3,752,127 | A | | 8/1973 | Baker |
| 5,441,017 | A | * | 8/1995 | Lindsay ............... A01K 27/003 119/161 |
| 5,713,616 | A | * | 2/1998 | Knudson ............... E01H 1/1206 206/223 |
| 5,718,192 | A | * | 2/1998 | Sebastian ............. A01K 27/006 119/795 |
| 5,727,500 | A | * | 3/1998 | Conboy ............... A01K 23/005 119/174 |
| D393,504 | S | * | 4/1998 | Eisman .......................... 383/22 |
| 5,890,637 | A | | 4/1999 | Furneaux |
| 6,019,067 | A | * | 2/2000 | Carey .................... A01K 27/006 119/795 |
| 6,035,809 | A | * | 3/2000 | Fingerett .............. A01K 27/004 119/796 |
| 6,073,590 | A | * | 6/2000 | Polding ................ A01K 27/006 119/795 |
| 6,085,695 | A | * | 7/2000 | Miller .................. A01K 27/006 119/795 |

(Continued)

FOREIGN PATENT DOCUMENTS

WO 2014/003323 A1 1/2014

*Primary Examiner* — Yvonne Abbott-Lewis
(74) *Attorney, Agent, or Firm* — McCarter & English, LLP; Jonathan M. Sparks; Anita M. Bowles

(57) ABSTRACT

Embodiments described herein include a pet accessory bag coupleable with a leash in multiple different configurations and a system including the pet accessory bag and leash. In one configuration, the pet accessory bag is coupled to a handle portion of the leash for walking a pet. In another configuration, the leash forms a strap enabling the pet accessory bag to be worn as a cross-body bag.

23 Claims, 5 Drawing Sheets

(56) References Cited

U.S. PATENT DOCUMENTS

| | | | |
|---|---|---|---|
| 6,257,473 B1 * | 7/2001 | Ringelstetter | E01H 1/1206 119/795 |
| 6,314,917 B1 * | 11/2001 | Ryan | A01K 27/004 119/796 |
| 6,418,881 B1 * | 7/2002 | Starratt | A01K 27/006 119/769 |
| 8,038,188 B1 * | 10/2011 | Nolan-Brown | A01K 27/006 119/796 |
| D676,232 S * | 2/2013 | Manning | D3/218 |
| D724,843 S * | 3/2015 | Abbott | D3/301 |
| D733,978 S * | 7/2015 | Bayless | D3/226 |
| 9,078,417 B1 * | 7/2015 | Lees | A45F 5/021 |
| 2006/0054107 A1 * | 3/2006 | Baker | A01K 27/006 119/795 |
| 2006/0231043 A1 * | 10/2006 | Galdo | A01K 27/006 119/796 |
| 2009/0095225 A1 * | 4/2009 | O'Connell | A01K 27/006 119/161 |
| 2010/0269763 A1 * | 10/2010 | Kraft | A01K 27/006 119/795 |
| 2011/0011504 A1 | 1/2011 | Steinbacher | |
| 2013/0298838 A1 | 11/2013 | Belmonte et al. | |

* cited by examiner

PET ACCESSORY BAG COUPLEABLE WITH LEASH IN MULTIPLE DIFFERENT CONFIGURATIONS

RELATED APPLICATIONS

This application claims priority to U.S. Provisional Application No. 61/998,849 filed on Jul. 2, 2014, and U.S. Provisional Application No. 62/130,872, filed on Mar. 10, 2015, the entire contents of both of which are incorporated by reference herein.

FIELD

Example embodiments include a pet accessory bag coupleable to a leash in multiple different configurations, a system including the pet accessory bag and an associated leash, and a method for forming the pet accessory bag.

BACKGROUND

Those who walk dogs or other pets can appreciate that a person walking a dog often needs to carry multiple pet accessories (e.g., dog treats, excrement pickup bags, etc.) and personal items (e.g., keys or a phone) as well as handle the dog's leash during a walk. Further, if the dog is allowed off leash during part of the walk, the person walking the dog must carry the leash and all associated accessories and personal items.

SUMMARY

Embodiments include a pet accessory bag and a configurable system including a pet accessory bag and a leash. The pet accessory bag and leash are configured to be used in a first configuration with the accessory bag coupled to a handle portion of a leash, and are configured to be used in a second configuration with the leash forming the handle of the accessory bag allowing the accessory bag to be worn by a person.

An embodiment provides a pet accessory bag including an elongate body having a first end and a second end, the elongate body including an opening extending substantially from the first end to the second end and including at least one releasable fastener for maintaining the opening in a closed position. The pet accessory bag also includes a leash handle coupling element attached to the first end, the leash handle coupling element configured to releasably engage a securing element of a handle of a leash. The pet accessory bag further includes a securing element attached to the second end, the securing element configured to be releasably engaged by a coupling element of a leash.

In some embodiments the leash handle coupling element includes a closable hook.

In some embodiments the securing element includes a ring. In some embodiments, the securing element includes a substantially D-shaped ring.

In some embodiments the at least one releasable fastener comprises a zipper. In some embodiments the zipper is attached to the elongate body such that a zipper pull of the zipper is located at or near the first end of the bag when the zipper is in a closed configuration.

In some embodiments the body comprises an outer layer of a first material and an inner layer of a second material. In some embodiments, the second material comprises a substantially water-resistant or water-proof material.

In some embodiments the body comprises a substantially water-resistant and stain resistant material.

In some embodiments the bag has a substantially rectangular prism shape.

In some embodiments the first end of the elongate body further comprises a first loop of material connecting the leash handle coupling element to the elongate body, and the second end further comprises a second loop of material connecting the securing element to the elongate body.

Another embodiments provides a system including a pet accessory bag and a leash. The leash includes a flexible leash body having a handle portion formed by a loop of the flexible leash body and a pet securing end opposite the handle portion. The leash also includes a securing element disposed at the handle portion and configured to be releasably engaged by the leash handle coupling element of the bag. The leash further includes a pet securing coupling element disposed at the pet securing end of the leash body, the pet securing coupling element configured to releasably engage an element of a pet harness or pet collar and configured to releasably engage the securing element of the pet accessory bag.

In some embodiments the pet securing coupling element includes a closeable hook.

In some embodiments the securing element of the leash includes a ring through which the loop of the handle portion passes. In some embodiments the securing element of the leash is a substantially D-shaped ring.

In some embodiments a shape and a material of the leash handle coupling element of the bag are substantially similar to a shape and a material of the pet securing coupling element of the leash. Further, a shape and a material of the securing element of the bag are substantially similar to a shape and a material of the securing element of the leash.

In some embodiments, a length of the leash is consistent with a length of a strap of a cross-body bag. In some embodiments a length of the leash falls in a range of 50 to 58 inches (127 to 147 cm). In some embodiments, a length of the leash falls in a range of 52 to 56 inches (132 to 142 cm). In some embodiments a length of the leash falls in a range of 53 to 55 inches (135 to 140 cm).

In some embodiments the leash further includes a leash adjustment element configured to enable a user to adjust a length of the leash.

In some embodiments the securing element of the leash is free to move along an entire length of the handle portion of the leash.

In some embodiments the securing element of the leash is free to move along an entire length of the loop of the handle portion of the leash.

These and other embodiments are disclosed in or otherwise encompassed by the following Detailed Description.

BRIEF DESCRIPTION OF THE DRAWINGS

The drawings are intended to illustrate the teachings taught herein and are not intended to show relative sizes and dimensions, or to limit the scope of examples or embodiments. In the drawings, the same numbers are used throughout the drawings to reference like features and components of like function.

DETAILED DESCRIPTION

Figure 1:
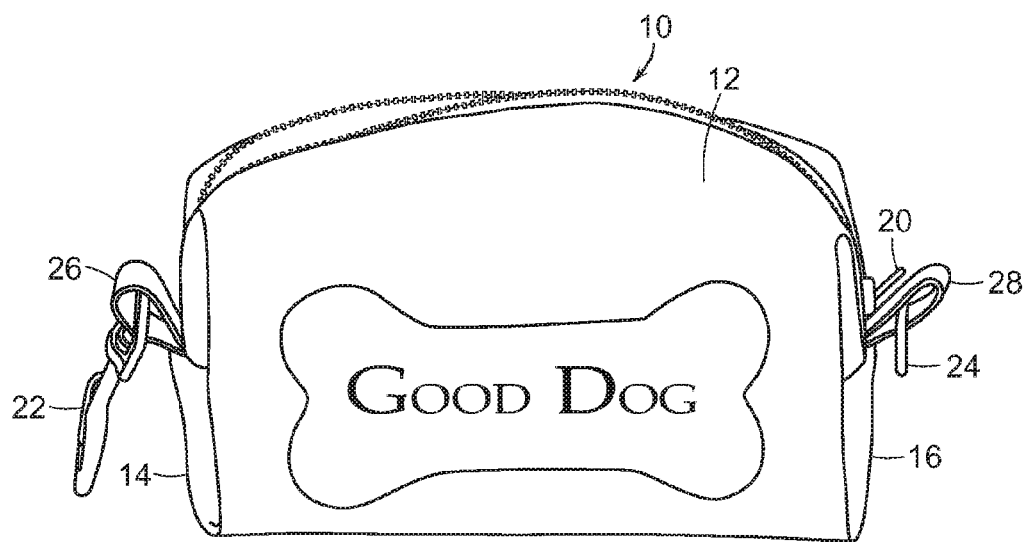
FIG. 1 is a front view of a pet accessory bag coupleable to a leash in multiple different configurations in accordance with an embodiment.

Example embodiments include a pet accessory bag sized and configured to hold pet accessories (e.g., treats, waste bags, a ball) and personal items (e.g., phone, keys, money) and coupleable to a pet leash. The pet accessory bag and leash can be coupled with each other in multiple different configurations for different uses. In one configuration the pet connecting end of the leash is coupled to a collar or harness of a pet and the pet accessory bag is coupled to a securing element at a handle portion of the leash. In this configuration, when a person is holding the handle portion of the leash, the pet accessory bag is supported by the leash handle and conveniently located near the hand of the person. In a second configuration, which may be useful if the pet is off leash, the first end of the pet accessory bag is coupled to a securing element of the handle portion of the leash and the other end of the leash is coupled to a securing element at the second end of the pet accessory bag. In this way, the leash forms a strap of a cross-body bag enabling the pet accessory bag to be worn by the person in a comfortable and stylish manner. In this second configuration, the pet accessory bag could alternatively be worn as a shoulder bag or around a person's waist. The pet accessory bag can also be uncoupled from the leash and the first end of the pet accessory bag coupled to a belt, backpack, stroller, or bicycle.

FIGS. 1-4 show various views of a pet accessory bag 10, in accordance with an embodiment. The bag 10 includes an elongate body 12 having a first end 14 and a second end 16. The elongate body 12 has an opening 18 extending substantially from the first end 14 to the second end 18 (see FIG. 4). In some embodiments, the opening extends the length of the elongate body 12 and through a portion of a face 15 of the first end of the body and through a portion of a face 17 of the second end of the body (see FIGS. 2-4). The elongate body 12 also includes at least one releasable fastener 20 for closing the opening 18. In some embodiments, the releasable fastener may be a zipper. In some embodiments, other suitable fasteners may be employed (e.g., VELCRO, buttons, clips, buckles, etc.).

Figures 2, 3:
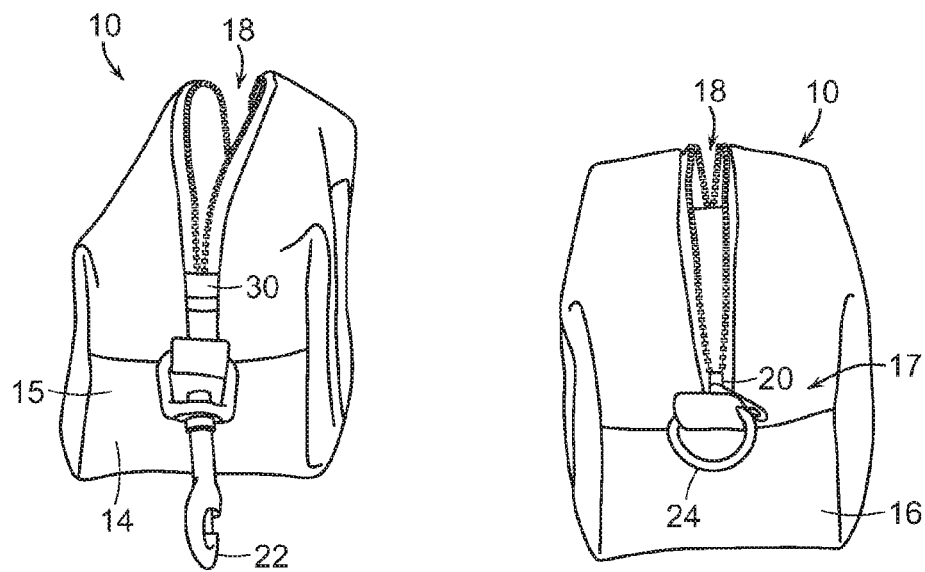
FIG. 2 is a first end view of the pet accessory bag of FIG. 1.
FIG. 3 is a second end view of the pet accessory bag of FIG. 1.

The bag 10 also includes a leash handle coupling element 22 attached to the first end 14 of the elongate body (see FIGS. 1 and 2). The leash handle coupling element 22 is configured to releasably engage a securing element of a handle of a leash.

Figure 5:
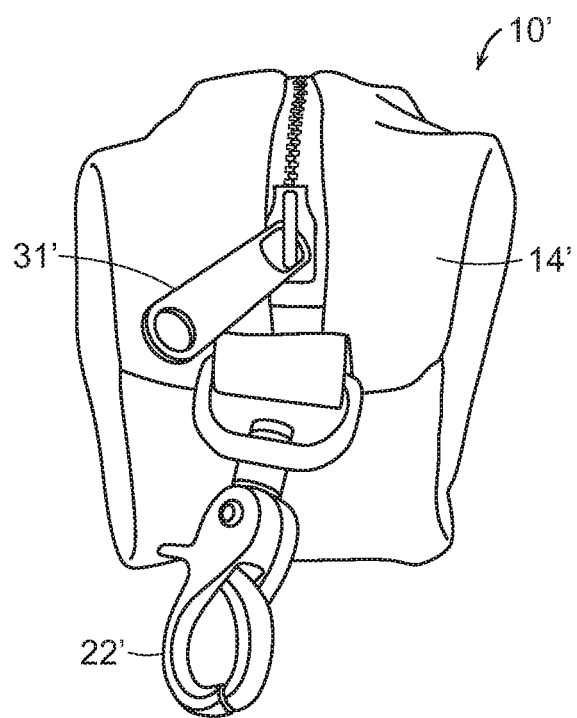
FIG. 5 is a first end view of a pet accessory bag having a different type of leash handle coupling element in accordance with another embodiment.

In some embodiments, the leash handle coupling element 22 has a swivel feature (e.g., a swivel trigger snap hook). In some embodiments, the leash handle coupling element has a closeable hook or similar configuration (e.g., a snap hook, a spring snap, a trigger snap, a scissor snap, a lobster claw hook, a bolt snap, a carabineer, etc.). FIG. 5 depicts a pet accessory bag 10' with a different type of leash handle coupling element 22' than the leash handle coupling element 22 depicted in FIGS. 1 and 2.

The bag also includes a securing element 24 attached to the second end 16 of the elongate body (see FIGS. 1 and 3). The securing element 24 is configured to be releasably engaged by a coupling element of a leash. In some embodiments, the securing element 24 is in the form of a ring. In some embodiments, the securing element 24 is in the form of a substantially D-shaped ring as shown.

The elongate body is sized and shaped to hold pet accessories and possibly personal items. In some embodiments, the elongate body has a shape similar to that of a rectangular prism. In one example, the elongate body has a rectangular prism shape with dimensions of about 6 inches long (15 cm) by 3 inches high (7.6 cm) by 2.75 inches (6.99 cm) wide.

In some embodiments the elongate body 10 includes a first outer layer of a first material and a second inner layer of a second material. In some embodiments, the second inner layer of the second material includes a water resistant or water-proof material (e.g., polyurethane coated nylon). In some embodiments, the first outer layer of the first material is a washable material (e.g., canvas duck). In some embodiments, the first outer layer may have a water and stain repellant coating (e.g., SCOTCH GUARD from 3M). The first material of the first outer layer may include a printed pet-themed design.

In some embodiments, the elongate body may be of a single layer of material that is water and stain resistant (e.g., a water and stain resistant thick nylon material).

Figure 4:
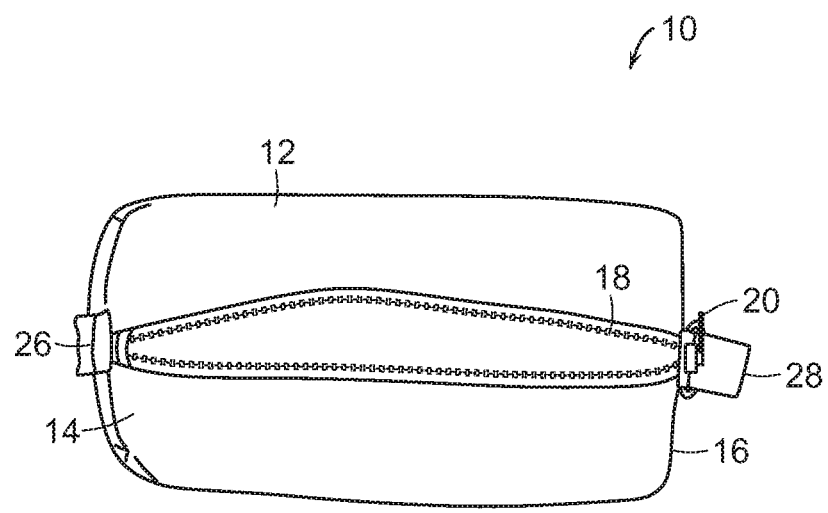
FIG. 4 is a top view of the pet accessory bag of FIG. 1.

In some embodiments, the bag 10 also includes a first loop of material 26 that connects the leash handle coupling element 22 to the elongate body 12 and a second loop of material 28 that connects the securing element 24 to the elongate body 12 (see FIGS. 1 and 4).

In some embodiments in which the releasable fastener 20 is a zipper, the bag also includes a zipper stop 30, which may be of a visually distinctive material (see FIG. 2). In some embodiments in which the releasable fastener 20 is a zipper, the zipper may begin at the second end 16 of the elongate body and may end at the first end 14 of the elongate body as shown in FIGS. 3 and 5 (e.g., a zipper pull 31' of the zipper may be located at the first end 14 near leash handle coupling element when the zipper is in a closed configuration and the zipper pull may be located at the second end 16 when the zipper is in an open configuration). This arrangement of the zipper may be particularly beneficial in preventing the contents of the bag from falling out when the zipper is inadvertently partially open and the bag is hung from a leash handle as the partially open portion of the zipper will be oriented up. In other embodiments, the zipper may begin at the second end 16 of the elongate body and end at the first end 14 of the elongate body.

Figure 6:
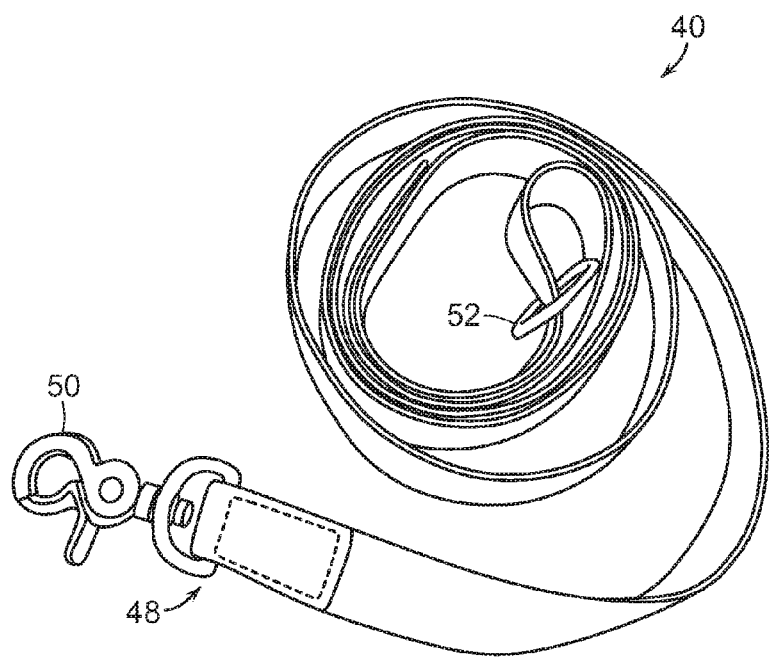
FIG. 6 is an image of a leash to which pet accessory bag can be coupled in accordance with an embodiment.
Figure 7:
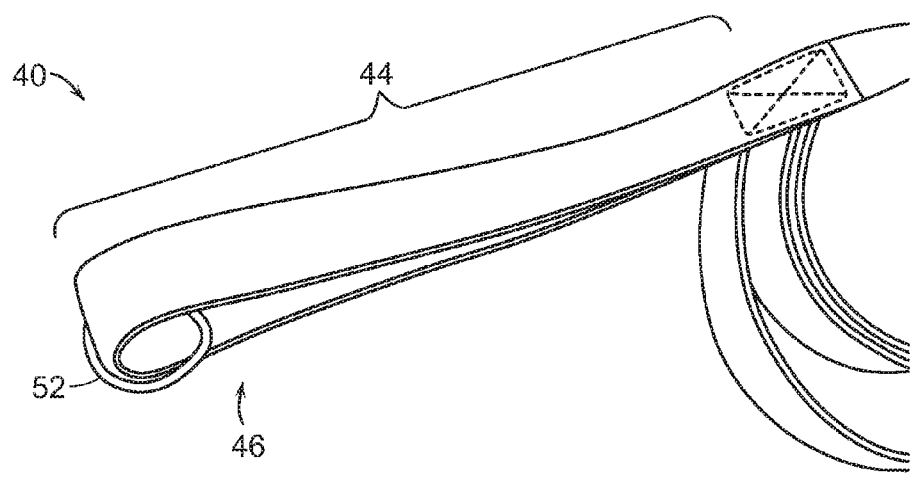
FIG. 7 is an image of a handle portion of the leash of FIG. 6.

FIGS. 6 and 7 depict a leash 40 in accordance with some embodiments. The leash 40 includes a flexible leash body 42 having a handle portion 44 formed by a loop 46 of the leash body and having a pet securing end 48 opposite the handle portion. In some embodiments, a material of the leash body 42 includes nylon webbing. In some embodiments, a material of the leash body includes a leather strip.

The leash also includes pet securing coupling element 50 disposed at the pet securing end 48 of the leash body. The pet securing coupling element 50 is configured to releasably engage an element of a pet harness or pet collar in the first configuration and configured to releasably engage the securing element of the pet accessory bag in the second configuration. In some embodiments, the pet securing coupling element 50 has a swivel feature (e.g., a swivel trigger snap hook). In some embodiments, the pet securing coupling element has a closeable hook or similar configuration (e.g., a snap hook, a spring snap, a trigger snap, a scissor snap, a lobster claw hook, a bolt snap, a carabineer, etc.).

The leash 40 also includes a securing element 52 disposed at the handle portion 44 and configured to be releasably engaged by the leash handle coupling element of the bag. In some embodiments, the securing element 52 is in the form of a ring. In some embodiments, the securing element 50 is in the form of a substantially D-shaped ring as shown. In some embodiments, the securing element 50 is free to move along a length of the loop 46. In some embodiments, the securing element 50 free to move along a length of the handle portion 44, which prevents the securing element 50 from interfering with the grip of a person while the leash is being used to walk a pet, and allows the securing element 50 to move to the end of the handle portion opposite the pet securing end 48 forming a strap configuration when the pet securing end of the leash is coupled to the second end of the bag.

A length of the leash 40 may be consistent with a length of a strap of a cross-body bag. In some embodiments, a length of the leash falls in a range of 50 to 58 inches (127 to 147 cm). In some embodiments, a length of the leash falls in a range of 52 to 56 inches (132 to 142 cm). In some embodiments, a length of the leash falls in a range of 53 to 55 inches (135 to 140 cm).

In some embodiments, the leash may be adjustable in length, which may be particularly useful when the bag and leash are used in a cross-body bag configuration. The leash may include a length adjustment element. For example, the leash may further include a slider element that enables a user to adjust the length of the leash. As would be appreciated by one of ordinary skill in the art in view of the present disclosure, any suitable known length adjustment element employed for leashes or straps for bags could be employed.

Figure 8:
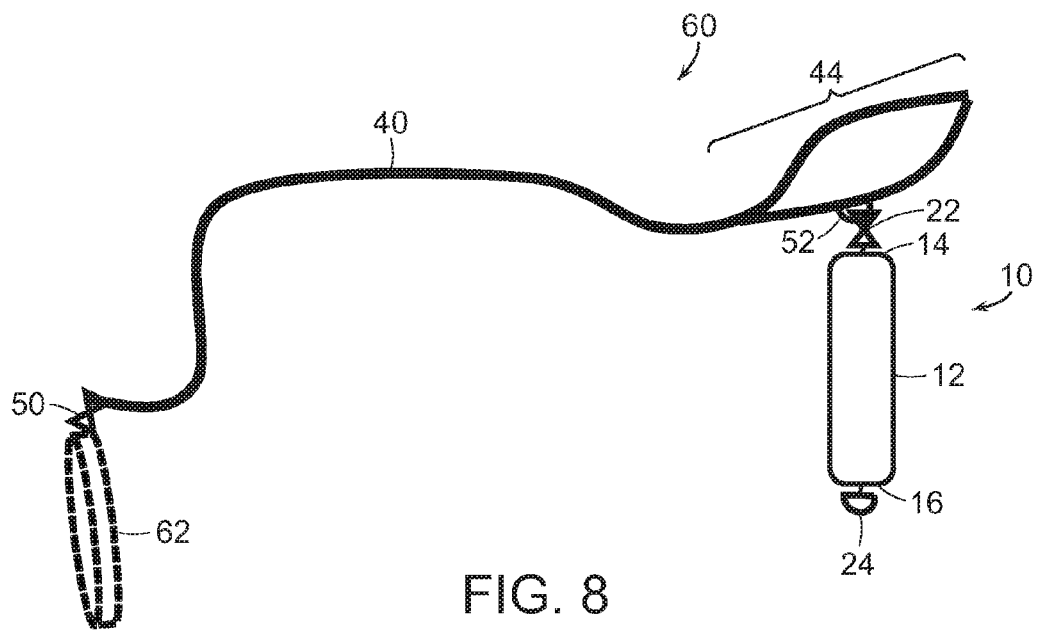
FIG. 8 schematically depicts a system of a pet accessory bag attached to a leash in a first configuration for walking a pet, in accordance with some embodiments.
Figure 9:
FIG. 9 is an image of the pet accessory bag of FIG. 1 and the leash of FIG. 6 in use with the bag and the leash in the first configuration for walking a pet, in accordance with some embodiments.

FIGS. 8 and 9 schematically depict two different configurations for a system 60 including the pet accessory bag 10 of FIG. 1-4 and the leash 40 of FIGS. 6 and 7. In FIGS. 8 and 9, elements are not to scale and sizes of various elements are exaggerated for illustrative purposes. In FIG. 8, the system 60 is in a first configuration useful for walking a pet in which the pet securing coupling element 50 of the leash is engaged with a harness or collar of a pet 62, which is shown with dotted lines. The leash handle coupling element 22 of the bag is engaged with the securing element 52 at the handle portion 44 of the leash. In this configuration, the bag 10 is supported by the handle portion 44 of the leash and is conveniently located at hand level. FIG. 9 is an image of a user walking a dog with the system in the first configuration.

Figure 10:
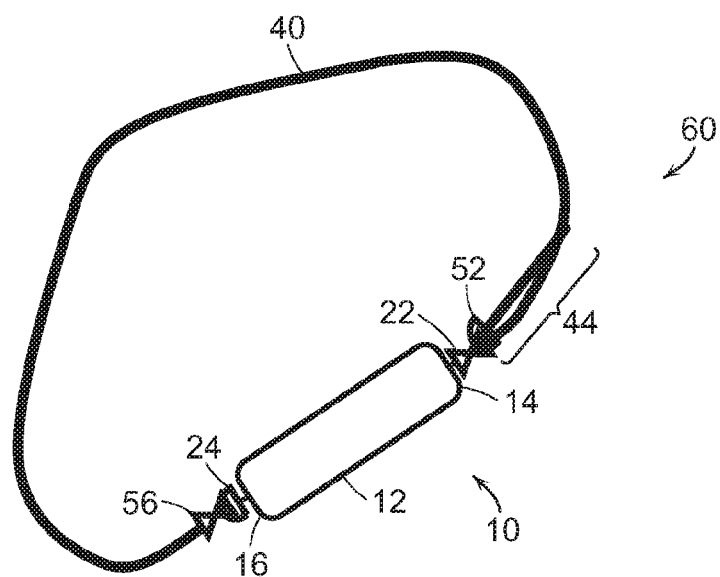
FIG. 10 schematically depicts a system of a pet accessory bag and a leash coupled to each other in a second configuration forming a cross-body bag, in accordance with an embodiment.
Figure 11:
FIG. 11 is an image of the pet accessory bag of FIG. 1 and the leash of FIG. 6 in use with the bag and the leash in a cross-body bag configuration, in accordance with some embodiments.

In FIG. 10, the system 60 is in a second configuration in which the pet securing coupling element 50 of the leash 40 is engaged with the securing element of the bag 24 and the leash handle coupling element 22 of the bag is engaged with the securing element 52 at the handle portion 44 of the leash forming a strap for a cross-body bag. FIG. 11 is an image of a user wearing the system in a cross-body configuration with the pet off-leash.

In some embodiment of a system, the leash handle coupling element 22 of the bag has a same configuration and is of the same material as the pet securing coupling element 50 of the leash. In some embodiments, the securing element 24 of the bag has a same configuration and is of the same material as the securing element 52 of the leash Example Pet Accessory Bag and Leash An example pet accessory bag and a leash were made. FIGS. 1-4 and 5-7 are images of the example bag and example leash respectively. The outside of the bag was #12 cotton duck canvas, natural color. It was lined with gray polyurethane coated 200 denier nylon oxford. The shape was a rectangular prism: 6 inches long×3 inches high×2¾ inches wide (15 cm long×7.6 cm high×7.0 cm wide). It had a black, nylon coil zipper with a black metal pull that began half way down the side (1½ inches or 3.8 cm) in the center of the first end of the bag, extended across the top and halfway down (1½ inches or 3.8 cm) the second end of the bag. There was an exposed zipper tab at the top of the zipper made of black/ivory cotton ticking strip, ¾ inch×⅜ inch (1.90 cm×0.95 cm) which functioned as a zipper stop as well as a distinctive design element. At the beginning and end of the zipper was a ⅝ inch (1.59 cm) wide, black nylon web loop sewn into the seam. Attached to one loop was a metal D-ring, and on the other side was a strap eye, swivel, and trigger snap hook. Materials for the bag included the following:

- Two pieces of Medium weight, black nylon webbing, ⅝ inch (1.59 cm) thick cut to 2 inches each
- Nickel D ring in ⅝ inch (1.59 cm)
- Nickel, trigger snap hook with ⅝ inch (1.59 cm) D ring
- 2 inch (5 cm)×1½ inch (3.8 cm) canvas label
- 12# canvas duck in natural color, cut to 12 inches×10 inches (30.5 cm×25.4 cm) with pre-printed art
- Gray polyurethane coated 200 denier nylon oxford, cut to 12 inches×10 inches (30.5 cm×25.4 cm) Black and ivory stripped ticking, cut to ¾ inch×⅜ inch (1.90 cm×0.95 cm)
- Black nylon zipper
- Black large zipper pull The example leash was a 4 foot 6 inch (137 cm) black, nylon dog leash that was ⅝ inch (1.59 cm) wide, had a D ring on the handle, and a trigger snap hook that matched the hook on the bag. Another example leash was made of leather. The leash length, which is not a length commonly used for leashes, was selected such that when used with the bag, the leash could form a strap to enabling the system to be worn as a cross body bag/purse. The materials of the leash included the following:

- Medium weight, black nylon webbing, ⅝ inch (1.59 cm) thick
- Nickel D ring in ⅝ inch (1.59 cm)
- Nickel, trigger snap hook with ⅝ inch (1.59 cm) D ring Steps for making the leash are listed below:

1. Cut nylon webbing to 60 inches (152 cm) using hot knife to seal the ends and prevent fraying
2. Slide D ring onto handle end of leash, fold over 12 inches (30.5 cm) down from top, creating a 6 inch (15.25 cm) loop or handle
3. Sew a ¾ inch×½ inch (1.90 cm×1.27 cm) rectangle to secure the handle. Then sew and "X" through rectangle. The D ring floats freely on the handle.
4. Slide the trigger snap hook onto the hook end of the leash, fold nylon over using 2 inches (5.1 cm) of material to create a one inch loop securing the trigger snap hook in the loop.
5. Sew a ¾ inch×½ inch (1.90 cm×1.27 cm) rectangle to secure the handle. Then sew and "X" through rectangle.

As may be recognized by those of ordinary skill in the pertinent art based on the teachings herein, numerous changes and modifications may be made to the above-described and other embodiments of the present disclosure without departing from the spirit of the invention as defined in the appended claims. Accordingly, this detailed description of embodiments is to be taken in an illustrative, as opposed to a limiting, sense. Those skilled in the art will recognize, or be able to ascertain using no more than routine experimentation, many equivalents to the specific embodiments of the described herein. Such equivalents are intended to be encompassed by the following claims.

LISTING OF REFERENCE NUMBERS 10 pet accessory bag
12 elongate body
14 first end of elongate body
15 face of first end
16 second end of elongate body
17 face of second end
18 opening of elongate body
20 releasable fastener for closing opening
22 leash handle coupling element of bag
24 securing element of bag
26 loop of material at first end
28 loop of material at second end
30 zipper stop
31 zipper pull
40 leash
42 flexible leash body
44 handle portion
46 loop of handle portion
48 pet securing end
50 pet securing coupling element
52 securing element
60 system
62 pet collar or harness

What is claimed is:

1. A system comprising:
   a pet accessory bag comprising:
      an elongate body having a first end and a second end, the elongate body including an opening extending substantially from the first end to the second end and including at least one releasable fastener for maintaining the opening in a closed position;
      a leash handle coupling element attached to the first end, the leash handle coupling element configured to releasably engage a securing element of a handle of a leash; and
      a securing element attached to the second end, the securing element configured to be releasably engaged by a coupling element of a leash; and
   a leash comprising:
      a flexible leash body having a handle portion formed by a loop of the flexible leash body and a pet securing end opposite the handle portion;
      a securing element disposed at the handle portion and configured to be releasably engaged by the leash handle coupling element of the bag, the securing element of the leash free to move along an entire length of the loop of the handle portion of the leash; and
      a pet securing coupling element disposed at the pet securing end of the leash body, the pet securing coupling element configured to releasably engage an element of a pet harness or pet collar and configured to releasably engage the securing element of the pet accessory bag;

wherein the system is configurable to be used in a first configuration with the pet accessory bag coupled to the handle portion of the leash when the leash is secured to a pet harness or pet collar and used in a second wearable configuration with the leash forming a strap of the pet accessory bag when the leash is not secured to a pet harness or pet collar.

2. The system of claim 1, wherein the leash handle coupling element comprises a closable hook.

3. The system of claim 1, wherein the securing element comprises a ring.

4. The system of claim 1, wherein the securing element comprises a substantially D-shaped ring.

5. The system of claim 1, wherein the at least one releasable fastener comprises a zipper.

6. The system of claim 5, wherein the zipper is attached to the elongate body such that a zipper pull of the zipper is located at or near the first end of the bag when the zipper is in a closed configuration.

7. The system of claim 1, wherein the body comprises an outer layer of a first material and an inner layer of a second material.

8. The system of claim 1, wherein the second material comprises a substantially water-resistant or water-proof material.

9. The system of claim 1, wherein the body comprises a substantially water-resistant and stain resistant material.

10. The system of claim 1, wherein the bag has a substantially rectangular prism shape.

11. The system of claim 1, wherein the first end further comprises a first loop of material connecting the leash handle coupling element to the elongate body, and wherein the second end further comprises a second loop of material connecting the securing element to the elongate body.

12. The system of claim 1, wherein the pet securing coupling element comprises a closeable hook.

13. The system of claim 1, wherein the securing element of the leash comprises a substantially D-shaped ring.

14. The system of claim 1, wherein a shape and a material of the leash handle coupling element of the bag are substantially similar to a shape and a material of the pet securing coupling element of the leash, and wherein a shape and a material of the securing element of the bag are substantially similar to a shape and a material of the securing element of the leash.

15. The system of claim 1, wherein a length of the leash is consistent with a length of a strap of a cross-body bag.

16. The system of claim 1, wherein a length of the leash falls in a range of 50 to 58 inches.

17. The system of claim 16, wherein a length of the leash falls in a range of 52 to 56 inches.

18. The system of claim 17, wherein a length of the leash falls in a range of 53 to 55 inches.

19. The system of claim 1, wherein the leash further comprises a leash adjustment element configured to enable a user to adjust a length of the leash.

20. A method comprising:
   providing a system including:
      a pet accessory bag comprising:
         an elongate body having a first end and a second end, the elongate body including an opening extending substantially from the first end to the second end and including at least one releasable fastener for maintaining the opening in a closed position;
         a leash handle coupling element attached to the first end of the pet accessory bag; and a securing element attached to the second end of the pet accessory bag;
a leash comprising:
a flexible leash body having a handle portion formed by a loop of the flexible leash body and having pet securing end opposite the handle portion;
a securing element disposed at the handle portion of the leash; and
a pet securing coupling element disposed at the pet securing end of the leash body;
releasably engaging the securing element of the leash with the leash handle coupling element of the pet accessory bag, thereby configuring the system to be used as a pet accessory bag attached to a handle portion of a leash; and
releasably engaging the securing element of the pet accessory bag with the pet securing coupling element of the leash, thereby configuring the system to be used as a wearable pet accessory bag when the leash is not secured to a pet.

21. The method of claim 20, wherein the securing element of the leash is free to move along an entire length of the loop of the handle portion of the leash.

22. A method of using a system including a pet accessory bag and a leash, the method comprising:
releasably coupling a leash handle coupling element of the pet accessory bag disposed at a first end of the pet accessory bag to a securing element of the leash disposed at a handle portion of the leash, and releasably coupling a pet securing coupling element of the leash to a collar or harness of a pet, thereby configuring the system for use as pet accessory bag carried on the handle portion of the leash while the leash is coupled to the collar or harness of the pet; and
detaching the pet securing coupling element of the leash from the collar or harness of the pet, and releasably coupling the pet securing coupling element of the leash with a securing element of the pet accessory bag disposed at a second end of the pet accessory bag, thereby configuring the system for use as a wearable pet accessory bag when the leash is not coupled to a collar or harness of the pet.

23. The method of claim 22, wherein the handle portion of the leash includes a flexible loop and the securing element of the leash is free to move along an entire length of the flexible loop of the handle portion of the leash.

* * * * *